(12) United States Patent
Ideshio et al.

(10) Patent No.: US 9,772,019 B2
(45) Date of Patent: Sep. 26, 2017

(54) FLUID TRANSMISSION DEVICE FOR VEHICLE

(71) Applicants: Toyota Jidosha Kabushiki Kaisha, Toyota-shi (JP); AISIN AW CO., LTD., Anjo-shi (JP)

(72) Inventors: Yukihiko Ideshio, Nissin (JP); Yuji Inoue, Nissin (JP); Minoru Abe, Aisai (JP)

(73) Assignees: TOYOTA JIDOSHA KABUSHIKI KAISHA, Toyota-shi (JP); AISIN AW CO., LTD., Anjo-shi (JP)

( * ) Notice: Subject to any disclaimer, the term of this patent is extended or adjusted under 35 U.S.C. 154(b) by 372 days.

(21) Appl. No.: 14/517,170

(22) Filed: Oct. 17, 2014

(65) Prior Publication Data

US 2015/0113972 A1 Apr. 30, 2015

(30) Foreign Application Priority Data

Oct. 28, 2013 (JP) ................................. 2013-223769

(51) Int. Cl.
*F16D 33/00* (2006.01)
*F16H 41/24* (2006.01)
*F16H 57/025* (2012.01)

(52) U.S. Cl.
CPC .......... *F16H 41/24* (2013.01); *F16H 57/025* (2013.01)

(58) Field of Classification Search
CPC .................................................... F16H 57/025
USPC ........................................................ 60/330
See application file for complete search history.

(56) References Cited

U.S. PATENT DOCUMENTS

2012/0210706 A1* 8/2012 Olsen ...................... F16H 41/24
60/330

FOREIGN PATENT DOCUMENTS

| JP | 5-118408 | 5/1993 |
|---|---|---|
| JP | 7-259952 | 10/1995 |
| JP | 8-233064 | 9/1996 |
| JP | 2001-241531 | 9/2001 |
| JP | 2005-83525 | 3/2005 |
| JP | 2012-42058 | 3/2012 |

* cited by examiner

*Primary Examiner* — Michael Leslie
*Assistant Examiner* — Daniel Collins
(74) *Attorney, Agent, or Firm* — Oblon, McClelland, Maier & Neustadt, L.L.P.

(57) ABSTRACT

A fluid transmission device for a vehicle includes a cover and a positioning member. The cover is configured to be driven rotatably about the axis of the fluid transmission device integrally with a drive plate. The drive plate includes a positioning hole that positions the drive plate and the cover. The positioning member is a columnar member. The positioning member is provided on the surface side of the cover, which is opposed to the drive plate, at a radially outer position of the cover. The positioning member protrudes to a drive-plate side in a state where the positioning member is arranged in the positioning hole. The positioning member protrudes from the drive plate obliquely with respect to the axis direction of the fluid transmission device. A radially outermost position of the positioning member is located on the radially inner side relative to a radially outermost position of the cover.

10 Claims, 4 Drawing Sheets

FLUID TRANSMISSION DEVICE FOR VEHICLE

INCORPORATION BY REFERENCE

The disclosure of Japanese Patent Application No. 2013-223769 filed on Oct. 28, 2013 including the specification, drawings and abstract is incorporated herein by reference in its entirety.

BACKGROUND OF THE INVENTION

1. Field of the Invention

The present invention relates to a fluid transmission device for a vehicle in which a drive plate is coupled.

2. Description of Related Art

There is a well-known fluid transmission device that includes a cover coupled with a drive plate that is fixed to an output rotational member of a driving source in a relatively non-rotatable manner. As an example of the fluid transmission device, a torque converter that includes a torque-converter case coupled with a drive plate is described in Japanese Patent Application Publication No. 2001-241531 (JP 2001-241531 A). JP 2001-241531 A discloses a vehicle that includes an engine, and a motor that is arranged on the engine side relative to the torque converter. In this vehicle, a boss is provided. The boss is formed so as to protrude from the torque-converter case. The outer surface of the boss, which comes into contact with the radially-outer portion of the drive plate, is inclined at a predetermined angle. The boss includes a through hole between its outer and inner peripheral surfaces. The drive plate is fixed to the boss by screwing a bolt, inserted from the drive-plate side through the through hole, into a nut arranged on the inner surface. With the structure as described above, even when the motor and the like are arranged on the engine side, fastening of the drive plate with the torque-converter case can still be easily performed, as disclosed in JP 2001-241531 A.

SUMMARY OF THE INVENTION

As described for the boss in JP 2001-241531 A, a coupling portion that couples a drive plate with a cover (hereinafter, referred to as "fastening portion") is provided so as to protrude from the cover. Thus, depending on the shape of the fastening portion, for example when it is necessary to ensure a space for inserting a bolt, a fluid transmission device may have a larger overall length in the axis direction accordingly. Further, depending on the arrangement position of the fastening portion, the fastening portion may be more likely to interfere with other constituent components located on the radially outer side relative to the outer periphery of the cover. Because the problems as described above have not been publicly known, there is room for improvement in the ease of mounting.

The present invention provides a fluid transmission device for a vehicle, which can reduce its overall length in the axis direction, and can also suppress interference with other constituent components.

A first aspect of the present invention is directed to a fluid transmission device for a vehicle. The vehicle includes a driving source, and a drive plate that is fixed to an output rotational member of the driving source. The fluid transmission device for a vehicle includes a cover and a positioning member. The cover is configured to be driven rotatably about an axis of the fluid transmission device integrally with the drive plate. The drive plate includes a positioning hole that positions the drive plate and the cover. The positioning member is a columnar member. The positioning member is provided on a surface side of the cover, which is opposed to the drive plate, at a radially outer position of the cover. The positioning member is configured to protrude to a drive-plate side in a state where the positioning member is arranged in the positioning hole. The positioning member is configured to protrude from the drive plate obliquely with respect to an axis direction of the fluid transmission device. A radially outermost position of the positioning member is located on a radially inner side relative to a radially outermost position of the cover.

According to the above aspect, the cover includes the positioning member that is provided so as to protrude to the drive-plate side obliquely with respect to the axis direction of the fluid transmission device. Thus, it is unnecessary to ensure a space for inserting a positioning member (or a fastening member such as a bolt) on the cover side. Accordingly, the overall length of the fluid transmission device in the axis direction can be reduced. Further, the radially outermost position of the positioning member is located on the radially inner side relative to the radially outermost position of the cover. Thus, interference of the fluid transmission device with other constituent components located on the radially outer side relative to the cover can be suppressed.

In the above aspect, the positioning member may be configured to protrude to an outside of the drive plate obliquely with respect to the axis direction of the fluid transmission device. According to the above aspect, while a drive-plate-side portion (a protruding portion) of the positioning member that protrudes to the outside of the drive plate obliquely with respect to the axis direction is more likely to interfere with other constituent components located on the radially outer side relative to the cover, the radially outermost position of the positioning member is located on the radially inner side relative to the radially outermost position of the cover. This is useful in suppressing interference of the fluid transmission device with the other constituent components described above.

In the above aspect, the positioning hole may be provided on a portion of the drive plate that is opposed to the positioning member in the axis direction of the fluid transmission device. According to the above aspect, when the drive plate and the cover are moved in a direction parallel to the axis and are positioned, the positioning member is provided so as to protrude obliquely with respect to the axis direction. Thus, assuming that a hole with a size just large enough to accommodate therein a member with a size equal to the circumference of the positioning member is provided as the positioning hole, the positioning member cannot be inserted through the positioning hole. To address this, the positioning-hole portion that is opposed to the positioning member in the axis direction is a space, and therefore the positioning member can be inserted through the positioning hole without interfering with the positioning hole.

In the above aspect, the positioning member may be a columnar member with a male thread, and the cover and the drive plate may be fastened by tightening a nut to the positioning member arranged in the positioning hole. According to the above aspect, the cover and the drive plate are positioned by inserting the positioning member through the positioning hole, and then are appropriately fastened with the nut that is tightened (screwed) to the positioning member.

In the above aspect, the positioning hole may include a circular portion, and a notched portion that is formed in order that a radially outer side of the circular portion communicates with an outer periphery of the drive plate. The notched portion may have a width in a circumferential direction larger than a width of the positioning member in a circumferential direction. According to the above aspect, the positioning member can be reliably inserted through the positioning hole without interfering with the drive plate. Further, at the time of positioning the cover and the drive plate, some misalignment can be permitted.

In the above aspect, the positioning member may be a columnar member with a male thread. The cover and the drive plate may be fastened by tightening the nut to the positioning member arranged in the positioning hole. According to the above aspect, the cover and the drive plate are positioned by inserting the positioning member through the positioning hole, and then are appropriately fastened with the nut that is tightened (screwed) to the positioning member.

In the above aspect, the notched portion may have a width in the circumferential direction smaller than a diameter of the circular portion. According to the above aspect, when the nut is tightened, the surface area of the nut, which comes into contact with the drive plate, can be increased as much as possible. Thus, the surface pressure applied to a portion of the drive plate, where the nut is tightened, can be reduced.

In the above aspect, a radially outermost position of the positioning hole may be located on a radially outer side relative to the radially outermost position of the positioning member. According to the above aspect, the positioning member can be reliably inserted through the positioning hole without interfering with the drive plate. Further, enlargement of the positioning hole caused by a centrifugal force can be prevented.

In the above aspect, the cover may include a polyhedron-shaped seat. The polyhedron-shaped seat may be provided on the surface side of the cover, which is opposed to the drive plate, at a radially outer position. The polyhedron-shaped seat may be provided so as to protrude toward the drive plate in the axis direction of the fluid transmission device. The polyhedron-shaped seat may include a fixing surface that is perpendicular to the positioning member, and that fixes the positioning member to the polyhedron-shaped seat. A first portion of the drive plate may be bent so as to extend along the fixing surface of the seat. The positioning hole may be provided in the first portion. According to the above aspect, the cover and the drive plate are appropriately positioned by inserting the positioning member through the positioning hole.

In the above aspect, a second portion of the drive plate, which is located on a radially outer side relative to the radially outermost position of the cover, may be bent so as to extend along an outer periphery of the cover. The second portion may be a portion located on the radially outer side relative to the radially outermost position of the cover. According to the above aspect, interference of the drive plate with other constituent components located on the radially outer side relative to the cover can be suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
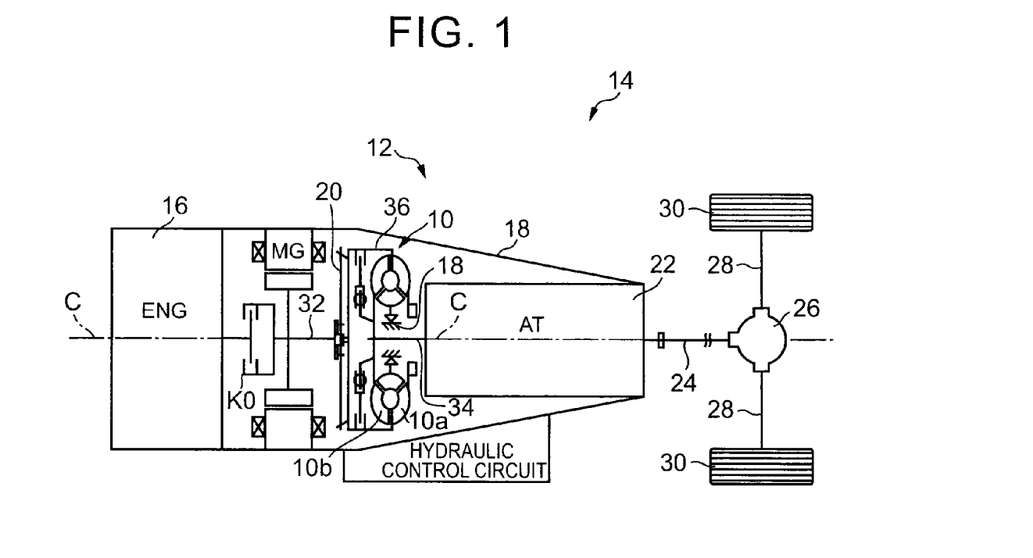
FIG. 1 is an explanatory diagram of a schematic configuration of a power transmission device that includes a fluid transmission device (a torque converter) to which the present invention is applied.

A first embodiment of the present invention is described below in detail with reference to the accompanying drawings. FIG. 1 is an explanatory diagram of a schematic configuration of a power transmission device 12 that includes a torque converter 10 that serves as a fluid transmission device to which the present invention is applied. In FIG. 1, the power transmission device 12 is provided in a vehicle 14. The vehicle 14 is a hybrid vehicle that includes an engine 16 and an electric motor MG that function as a driving source for traveling the vehicle 14. Within a transmission case 18 that serves as a non-rotatable member, the power transmission device 12 includes a clutch K0 that connects or disconnects an engine (hereinafter, referred to as "clutch K0"), a drive plate 20, a torque converter 10, an automatic transmission 22, a propeller shaft 24, a differential gear 26, a pair of axles 28, and the like, in the described order from the engine side. The power transmission device 12 constitutes a power transmission path from the engine 16 to drive wheels 30. In the vehicle 14, power of the engine 16 when the clutch K0 is engaged, or power of the electric motor MG, is transmitted to a pair of the drive wheels 30 through this power transmission path.

The drive plate 20 is arranged between the clutch K0 (or the electric motor MG) and the torque converter 10. The drive plate 20 is fixed to a connecting shaft 32 that serves as an output rotatable member of the driving source (the engine 16 and the electric motor MG). The drive plate 20 is a disk-shaped rotatable member that is driven rotatably about an axis C by power of the driving source. The drive plate 20 connects the connecting shaft 32 and the torque converter 10 to transmit power of the driving source to the torque converter 10. The axis C is the rotation axis of the connecting shaft 32, and is common to the rotation axis of a transmission input shaft 34 that serves as an input rotatable member of the automatic transmission 22.

The torque converter 10 is coupled with the drive plate 20. The torque converter 10 includes a cover 36 that is driven rotatably about the axis C integrally with the drive plate 20 by power of the driving source. The cover 36 is an input-side rotatable member of the torque converter 10, and rotates integrally with the connecting shaft 32. The transmission input shaft 34 is an output-side rotatable member of the torque converter 10. Thus, the rotation axis of the torque converter 10 is the axis C. The axis of the drive plate 20 and the axis of the cover 36 are concentric.

Figure 2:
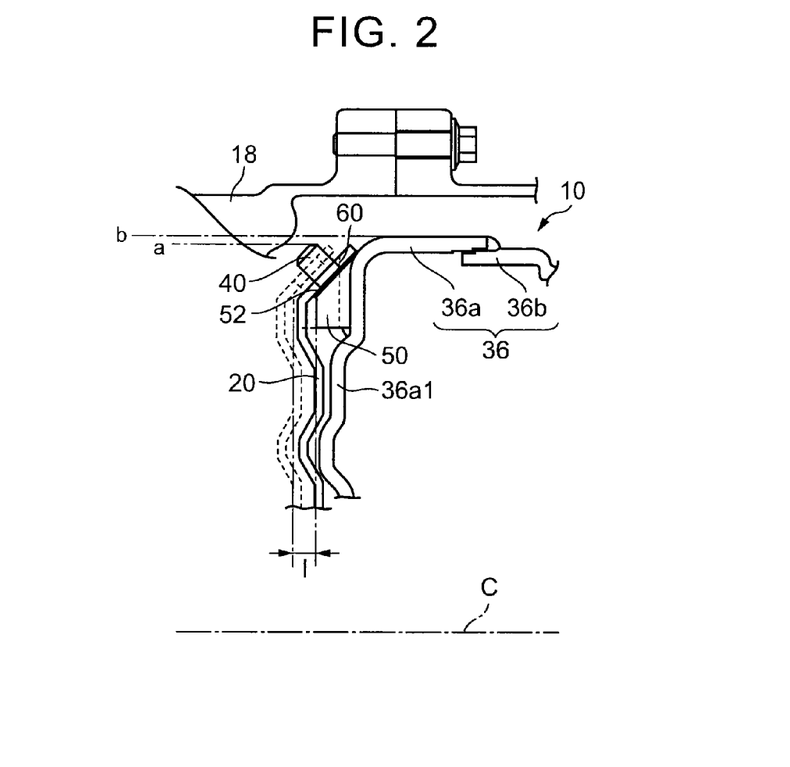
FIG. 2 is an explanatory diagram of the torque converter and a drive plate that have a fastening structure according to a first embodiment of the present invention.

As shown in FIG. 2, the cover 36 includes a front cover 36a that is a cover on the drive plate side (on the left in FIG. 2), and a pump shell 36b that is a cover on the automatic transmission side (on the right in FIG. 2). The cover 36 is configured to be oil-tight by integrally coupling the front cover 36a with the pump shell 36b by, for example, welding. The front cover 36a includes, on one side, a circular surface 36a1 that is opposed to the drive plate 20. The front cover 36a is a bottomed cylindrical member that is open on the other side. On the open side, the pump shell 36b is coupled with the front cover 36a. Within the cover 36, hydraulic oil is filled, and also a pump impeller 10a and a turbine impeller 10b are accommodated so as to be opposed to each other. The pump impeller 10a is formed integrally with the cover 36 that is an input element of the torque converter 10. The pump impeller 10a is connected with the connecting shaft 32 through the drive plate 20. The turbine impeller 10b is an output element. The turbine impeller 10b is directly connected with the transmission input shaft 34.

Figure 7:
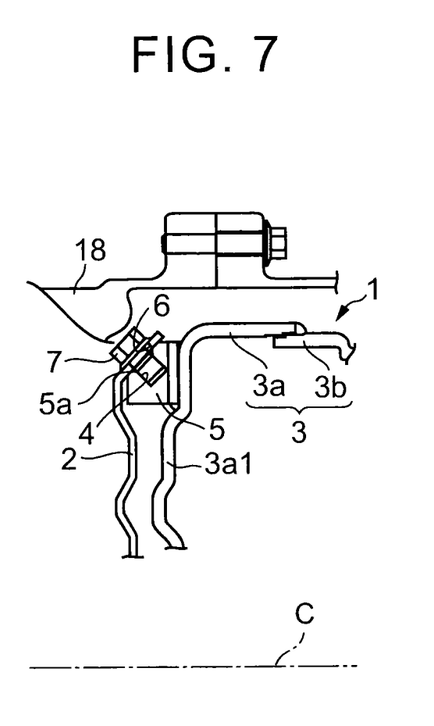
FIG. 7 is an explanatory diagram of a comparative example having a fastening structure to be compared to the first embodiment.

The drive plate 20 is screwed with a plurality of bolts to the end of the connecting shaft 32, and then the drive plate 20 and the cover 36 (particularly, the front cover 36a) are fastened with each other. A fastening structure of the drive plate 20 and the cover 36 is explained below in detail. FIG. 7 is an explanatory diagram of a torque converter 1 and a drive plate 2 as a comparative example having a fastening structure to be compared to the first embodiment.

In FIG. 7, similarly to the torque converter 10, the torque converter 1 is provided within the transmission case 18, and includes a cover 3. The cover 3 includes a front cover 3a that includes a circular surface 3a1 opposed to the drive plate 2, and a pump shell 3b. The cover 3 (particularly, the front cover 3a) includes a plurality of seats 5 arranged concentrically in the circumferential direction with a predetermined spacing therebetween. Each of the seats 5 is provided at a radially outer position of the surface 3a1 so as to protrude in the direction of the axis C toward the drive plate 2. The seat 5 has a polyhedron shape, and includes a bolt screw hole 4 with a female thread. The bolt screw hole 4 is formed obliquely outward with respect to the direction of the axis C in the direction toward the drive plate 2. The seat 5 includes a contact surface 5a. The contact surface 5a is a surface perpendicular to the direction in which the bolt screw hole 4 is formed (to the center line of the bolt screw hole 4), and is also a surface on which the bolt screw hole 4 is formed. The contact surface 5a is a surface that comes into contact with the drive plate 2. The drive plate 2 includes a plurality of bolt insertion holes 6 arranged concentrically in the circumferential direction with a predetermined spacing therebetween. Each of the bolt insertion holes 6 is formed at a radially outer position that is opposed to the bolt screw hole 4 (the contact surface 5a). A portion of the drive plate 2, which is formed with the bolt insertion hole 6, is configured to be bent so as to extend along the contact surface 5a of the seat 5. The drive plate 2 and the cover 3 are positioned so as to align the bolt screw hole 4 and the bolt insertion hole 6 with each other, and then are connected with each other by a bolt 7 screwed from the side of the drive plate 2 through the bolt insertion hole 6 into the bolt screw hole 4.

In the torque converter 1 shown as the comparative example in FIG. 7, the seat 5 includes therein a female thread (includes therein the bolt screw hole 4). Thus, it is necessary to leave a clearance for receiving the bolt 7, and in addition to that, the width of the seat 5 in the direction of the axis C is comparatively larger. Accordingly, there is a concern for an increase in the overall length of the torque converter 1 in the direction of the axis C. Further, depending on the position where the seat 5 is provided, there is a concern for interference of the torque converter 1, the drive plate 2, and the like with other constituent components (for example, the transmission case 18) located on the radially outer side relative to the cover 3.

The torque converter 10 and the drive plate 20 according to the first embodiment have a fastening structure that can prevent or suppress the concerns described above in the comparative example in FIG. 7. In FIG. 2, the cover 36 includes a plurality of columnar positioning members 40 that are provided at a radially outer position of the surface 36a1 so as to protrude to the side of the drive plate 20. The positioning members 40 are arranged concentrically in the circumferential direction with a predetermined spacing therebetween. Each of the positioning members 40 is arranged in a positioning hole 60 described later. The positioning member 40 is provided so as to protrude obliquely outward with respect to the direction of the axis C to the side of the drive plate 20. It is useful to provide the positioning member 40 so as to protrude obliquely outward relative to the direction of the axis C to the side of the drive plate 20, from the viewpoint of facilitating fastening of the drive plate 20 with the cover 36 in the case in which the electric motor MG is arranged between the engine 16 and the torque converter 10, for example. A radially outermost position "a" of the positioning member 40 is located on the radially inner side relative to a radially outermost position "b" of the cover 36 in order to suppress interference of the torque converter 10 with other constituent components (for example, the transmission case 18) located on the radially outer side relative to the cover 36. The inclination angle of the positioning member 40 with respect to the direction of the axis C is a predetermined angle that is set in consideration of, for example, reducing the overall length of the torque converter 10 in the direction of the axis C, suppressing interference of the torque converter 10 with the transmission case 18 located on the radially outer side relative to the cover 36, and the ease of assembly of the drive plate 20 and the cover 36. The cover 36 (particularly, the front cover 36a) includes a plurality of polyhedron-shaped seats 50 that are provided at a radially outer position of the surface 36a1 so as to protrude in the direction of the axis C toward the drive plate 20. The seats 50 are arranged concentrically in the circumferential direction with a predetermined spacing therebetween. Each of the seats 50 includes a fixing surface 52 that is perpendicular to the positioning member 40, that fixes the positioning member 40 thereto, and that comes into contact with the drive plate 20. That is, the positioning member 40 is fixed to the seat 50. The drive plate 20 includes the positioning hole 60 that positions the drive plate 20 and the cover 36 (particularly, the front cover 36a). That is, the drive plate 20 includes the positioning hole 60, through which the positioning member 40 is inserted, for the purpose of positioning the drive plate 20 and the cover 36. For example, the drive plate 20 includes a plurality of the positioning holes 60, each of which is formed at a radially outer position that is opposed to the positioning member 40. The positioning holes 60 are arranged concentrically in the circumferential direction with a predetermined spacing therebetween. A portion of the drive plate 20, which is formed with the positioning hole 60, is configured to be bent so as to extend along the fixing surface 52 of the seat 50. The drive plate 20 and the cover 36, which are configured as described above, are positioned by inserting the positioning member 40 through the positioning hole 60. The seat 50 is not formed with any hole, such as the bolt screw hole 4, through which a positioning member or a fastening member such as the bolt 7 is inserted. Thus, it is unnecessary for the seat 50 to ensure a space for forming the hole described above. Accordingly, the width of the seat 50 in the direction of the axis C can be reduced. The dotted line in FIG. 2 shows the position of the seat 5 and the drive plate 2 shown in FIG. 7, when it is assumed that they are overlapped on the torque converter 10. As it is apparent from the comparison between the solid line and the dotted line in FIG. 2, the width of the seat 50 in the direction of the axis C is reduced by a length "l" as compared to the width of the seat 5 in the direction of the axis C.

As described above, according to the first embodiment, the cover 36 includes the positioning member 40 that is provided so as to protrude obliquely outward with respect to the direction of the axis C of the torque converter 10 to the side of the drive plate 20. Thus, as it is unnecessary to ensure a space for inserting a positioning member (or a fastening member such as a bolt) on the side of the cover 36, the overall length of the torque converter 10 in the direction of the axis C can be reduced accordingly. The radially outermost position "a" of the positioning member 40 is located on the radially inner side relative to the radially outermost position "b" of the cover 36. This can suppress interference of the torque converter 10 with the transmission case 18 located on the radially outer side relative to the cover 36. When the positioning member 40 is provided so as to protrude obliquely outward with respect to the direction of the axis C, a portion (a protruding portion) of the positioning member 40, which is located on the drive plate side, is more likely to interfere with the transmission case 18. To address this, the radially outermost position "a" of the positioning member 40 is located on the radially inner side relative to the radially outermost position "b" of the cover 36. This is useful in suppressing interference of the torque converter 10 with the transmission case 18.

According to the first embodiment, the cover 36 includes the seat 50 that includes the fixing surface 52 that fixes the positioning member 40 thereto. A portion of the drive plate 20, which is formed with the positioning hole 60, is bent so as to extend along the fixing surface 52. Thus, the cover 36 and the drive plate 20 are appropriately positioned by inserting the positioning member 40 through the positioning hole 60.

Next, other embodiments of the present invention are explained. In the following explanations, common components between the embodiments are designated with like numerals, and therefore their explanations are omitted.

The drive plate 20 and the cover 36 according to the first embodiment previously described are moved in a direction parallel to the axis C so as to shorten their relative distance, for example, and are then positioned by inserting the positioning member 40 through the positioning hole 60. In addition, the positioning member 40 is provided so as to protrude obliquely outward with respect to the axis direction. Thus, in the case in which the positioning hole 60 has a size just large enough to accommodate therein a member with a size equal to the circumference of the positioning member 40, the positioning member 40 interferes with a drive plate, and thus cannot be inserted through the positioning hole 60. Therefore, the positioning hole 60 is a hole in which a portion that is opposed to the positioning member 40 in the direction of the axis C (a portion of the drive plate 20, which is interfered with by the positioning member 40 when the drive plate 20 and the cover 36 are moved in a direction parallel to the axis C, and are positioned) is a space.

Figure 3:
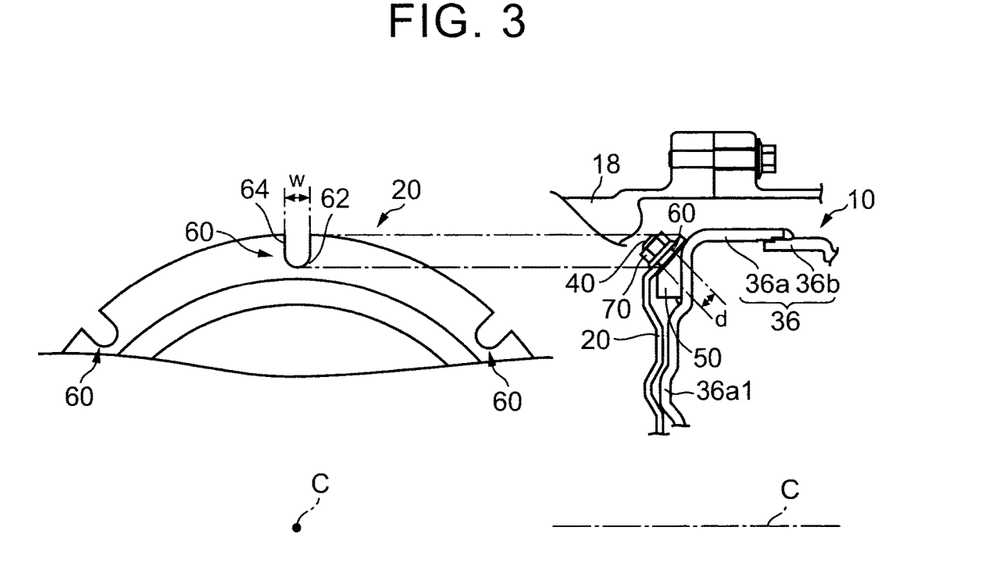
FIG. 3 is a further explanatory diagram of the torque converter and the drive plate that have a fastening structure according to a second embodiment of the present invention.

Specifically, as shown in FIG. 3, the positioning hole 60 includes a circular portion 62, and a notched portion 64 that is formed in order that the radially outer side of the circular portion 62 communicates with the outer periphery of the drive plate 20. A width "w" of the notched portion 64 in the circumferential direction is larger than a width "d" of the positioning member 40 in the circumferential direction. Thus, in the positioning hole 60, a portion that is opposed to the positioning member 40 in the direction of the axis C is a space. The positioning member 40 is a columnar member. The width "d" of the positioning member 40 in the circumferential direction is a diameter "d" of the positioning member 40.

The positioning member 40 is a stud bolt with a male thread, for example. The cover 36 and the drive plate 20 are fastened by tightening a nut 70 to the positioning member 40 inserted through the positioning hole 60.

As described above, according to a second embodiment of the present invention, the positioning hole 60 is provided on a portion that is opposed to the positioning member 40 in the direction of the axis C. Thus, a portion of the drive plate 20, which is opposed to the positioning member 40 in the direction of the axis C when the drive plate 20 and the cover 36 are moved in a direction parallel to the axis C and are positioned, is a space. Accordingly, the positioning member 40 can be inserted through the positioning hole 60 without interfering with the positioning hole 60.

According to the second embodiment, the positioning hole 60 includes the circular portion 62 and the notched portion 64, and the width "w" of the notched portion 64 in the circumferential direction is larger than the diameter "d" of the positioning member 40. Therefore, the positioning member 40 can be reliably inserted through the positioning hole 60 without interfering with the positioning hole 60. Further, at the time of positioning the cover 36 and the drive plate 20, some misalignment can be permitted.

According to the second embodiment, the cover 36 and the drive plate 20 are positioned by inserting the positioning member 40 through the positioning hole 60, and then are appropriately fastened with the nut 70 that is tightened (screwed) to the positioning member 40.

Figure 4:
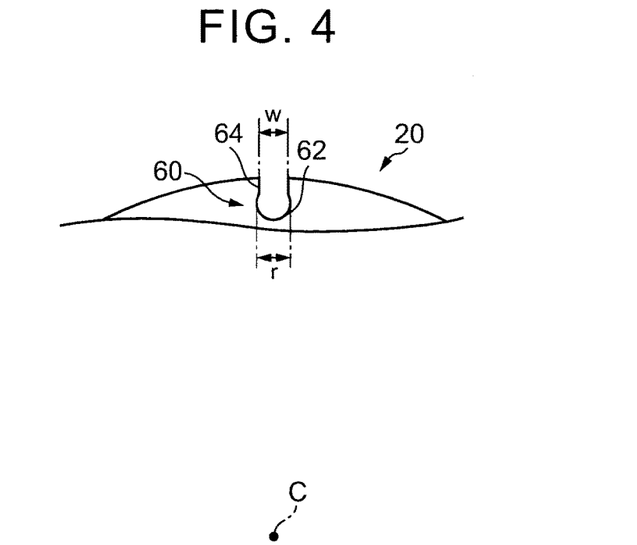
FIG. 4 is an explanatory diagram of a fastening structure according to a third embodiment of the present invention, which is different from the second embodiment in FIG. 3.

In the second embodiment previously described, the width "w" of the notched portion 64 in the circumferential direction is substantially equal to a diameter "r" of the circular portion 62. Pressure, generated by tightening the nut 70, is applied to the periphery of the positioning hole 60. Thus, it is desirable that the pressure per unit area, to be applied to the periphery of the positioning hole 60, is low. Accordingly, in a third embodiment of the present invention, as shown in FIG. 4, the width "w" of the notched portion 64 in the circumferential direction is smaller than the diameter "r" of the circular portion 62.

As described above, according to the third embodiment, when the nut 70 is tightened, the surface area of the nut 70, which comes into contact with the drive plate 20, can be increased as much as possible. Therefore, the surface pressure applied to a portion of the drive plate 20, where the nut 70 is tightened, can be reduced.

In the second embodiment previously described, the positioning hole 60 includes the notched portion 64, and thus a portion that is opposed to the positioning member 40 in the direction of the axis C is a space. However, the positioning hole 60 is not necessarily limited to the aspect as described above, and may be closed on its periphery as shown in FIG.

Figure 5:
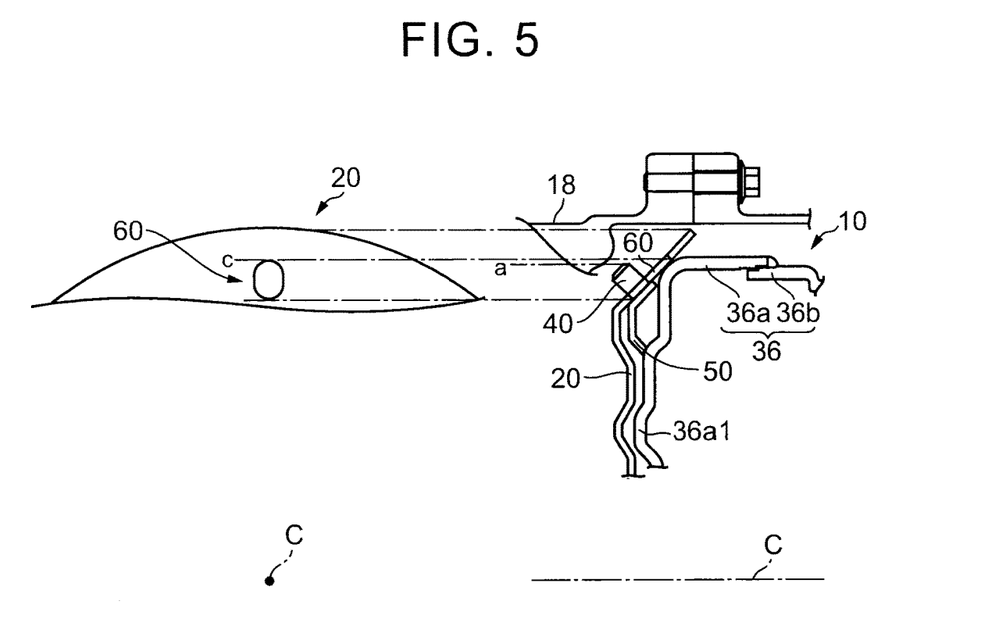
FIG. 5 is an explanatory diagram of a fastening structure according to a fourth embodiment of the present invention, which is different from the second embodiment in FIG. 3.

5. That is, the positioning hole 60 may include the circular portion 62 also on the notched portion side shown in FIG. 3 in order to be closed on the notched portion side. However, in this case, it is desirable that a radially outermost position "c" of the positioning hole 60 is located on the radially outer side relative to the radially outermost position "a" of the positioning member 40. Thus, in the positioning hole 60, a portion that is opposed to the positioning member 40 in the direction of the axis C is a space. The positioning hole 60 does not include a notch itself, and therefore when the drive plate 20 rotates, enlargement of a notched portion caused by a centrifugal force does not occur, for example. In order for the diameter of the drive plate 20 not to be excessively increased, the radially outermost position "c" of the positioning hole 60 may be located on the radially outer side relative to the radially outermost position "a" of the positioning member 40 only to such an extent that the positioning member 40 can be inserted through the positioning hole 60 without interfering with the positioning hole 60. The seat 50 according to a fourth embodiment of the present invention is a hollow polyhedron-shaped seat that is formed by bending a plate member, for example.

As described above, according to the fourth embodiment, the positioning hole 60 is a hole with its periphery closed, and the radially outermost position "c" of the positioning hole 60 is located on the radially outer side relative to the radially outermost position "a" of the positioning member 40. Thus, the positioning member 40 can be reliably inserted through the positioning hole 60 without interfering with the positioning hole 60. Further, enlargement of the positioning hole 60 caused by a centrifugal force can be prevented.

Figure 6:
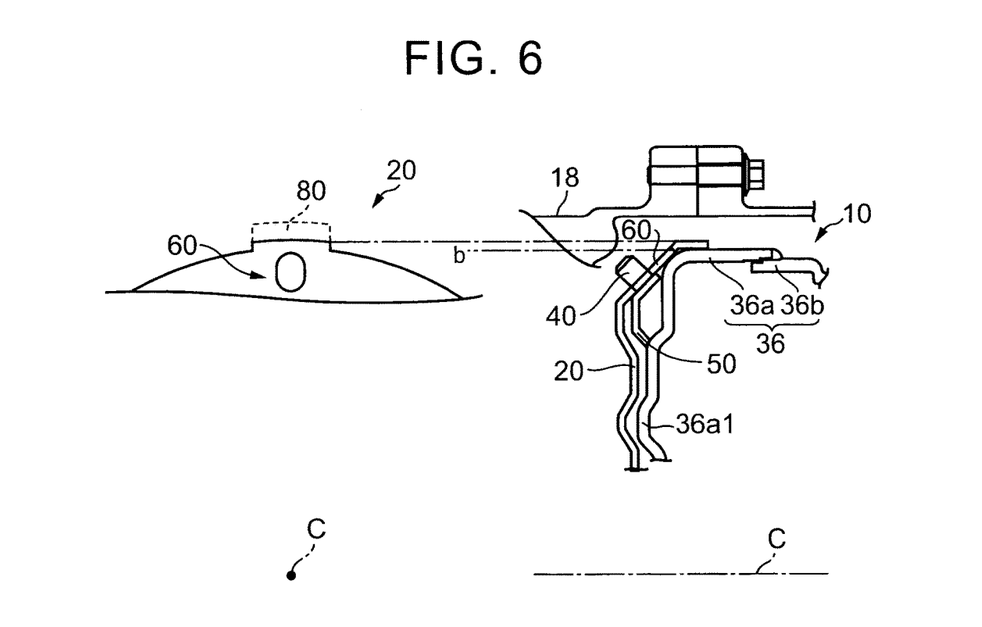
FIG. 6 is an explanatory diagram of a fastening structure according to a fifth embodiment of the present invention, which is different from the fourth embodiment in FIG. 5.

In the fourth embodiment previously described, the positioning hole 60 is a hole with its periphery closed, in which a portion that is opposed to the positioning member 40 in the direction of the axis C is a space. With this configuration, the drive plate 20 has a larger diameter, and is more likely to interfere with other constituent components (for example, the transmission case 18) located on the radially outer side relative to the cover 36. Thus, in a fifth embodiment of the present invention, as shown in FIG. 6, the drive plate 20 is configured in which its radially outer portion relative to the radially outermost position "b" of the cover 36 is bent so as to extend along the outer periphery of the cover 36. A protruding portion 80 shown by the dotted line in FIG. 6 represents this bent portion of the drive plate 20. The basic shape of the drive plate 20 in its entirety is a disk shape. However, a part of the outer periphery of the drive plate 20 is not substantially circular in order to facilitate bending. The protruding portion 80 described above is formed on the radially outer portion at the position corresponding to the positioning hole 60.

As described above, according to the fifth embodiment, preventing enlargement of the positioning hole 60 caused by a centrifugal force, and suppressing interference of the drive plate 20 with the transmission case 18 can both be achieved.

Although the embodiments of the present invention have been described above in detail with respect to the drawings, the present invention is also applied to other aspects.

For example, while each of the foregoing embodiments is separately implemented, each of the foregoing embodiments is not necessarily implemented separately. These embodiments may be appropriately implemented in combination. For example, the fifth embodiment previously described is used in addition to the fourth embodiment previously described. When the radially outermost position of the drive plate 20 in the first to third embodiments previously described is located on the radially outer side relative to the radially outermost position "b" of the cover 36, the fifth embodiment may be used in addition to the first to third embodiments.

Further, in the foregoing embodiments, the positioning member 40 is provided so as to protrude obliquely outward with respect to the direction of the axis C. However, the positioning member 40 is not limited thereto. For example, the positioning member 40 may be provided so as to protrude obliquely inward with respect to the direction of the axis C. With this configuration, the overall length of the torque converter 10 in the direction of the axis C can also be reduced in the same way as in the case in which the positioning member 40 is provided so as to protrude obliquely outward with respect to the direction of the axis C. The cover side portion (a fixed portion) of the positioning member 40 that protrudes obliquely inward with respect to the axis direction is more likely to interfere with the transmission case 18 located on the radially outer side relative to the cover 36. To address this, the radially outermost position of the positioning member 40 is located on the radially inner side relative to the radially outermost position of the cover 36. This is useful in suppressing interference of the torque converter 10 with the transmission case 18.

In the foregoing embodiments, the cover 36 includes the seat 50, and also includes the positioning member 40 by fixing the positioning member 40 to the seat 50. However, the cover 36 is not limited thereto. For example, the cover 36 may include the positioning member 40 that is directly provided on the surface 36a1.

While in the foregoing embodiments, the torque converter 10 is used as the fluid transmission device, other fluid transmission devices such as a fluid coupling that does not have a torque amplifying function may also be used.

In the foregoing embodiments, the vehicle 14 is a hybrid vehicle that is equipped with the engine 16 and the electric motor MG as a driving source. However, the vehicle 14 is not limited thereto. For example, the vehicle 14 may also be a vehicle that is only equipped with the engine 16 as a driving source. The vehicle 14 may also be a vehicle that is only equipped with the electric motor MG as a driving source. Further, while the clutch K0 and the automatic transmission 22 are provided in the vehicle 14, the clutch K0 and the automatic transmission 22 are not necessarily provided in the vehicle 14. The present invention is applicable to any vehicle as long as a fluid transmission device is provided in the vehicle, and includes a cover that is coupled with a drive plate, and that is driven rotatably about the axis integrally with the drive plate.

In the present invention, the fluid transmission device may constitute a part of a power transmission device provided in a vehicle. This power transmission device constitutes a power transmission path from an engine to drive wheels. The power transmission device includes a transmission located downstream of the fluid transmission device (on the drive-wheel side), for example. Examples of this transmission include various automatic transmissions (such as a planetary-gear automatic transmission, a synchromesh two-parallel-shaft automatic transmission, a DCT, and a CVT). As the driving source, an international combustion engine, such as a gasoline engine or a diesel engine, is used, for example. Another prime mover such as an electric motor can be solely employed, or can be employed in combination with the engine.

The above embodiments are merely intended to be illustrative. The present invention may be implemented in an aspect with various modifications and improvements added based on the knowledge of persons skilled in the art.

What is claimed is:

1. A fluid transmission device for a vehicle, the vehicle including a driving source, and a drive plate that is fixed to an output rotational member of the driving source, the fluid transmission device comprising:
   a cover configured to be driven rotatably about an axis of the fluid transmission device integrally with the drive plate, the drive plate including a positioning hole that positions the drive plate and the cover; and
   a positioning member that is a columnar member, the positioning member being provided on a surface side of the cover, which is opposed to the drive plate, at a radially outer position of the cover, the positioning member configured to protrude to a drive-plate side in a state where the positioning member is arranged in the positioning hole, the positioning member configured to protrude from the drive plate obliquely with respect to an axis direction of the fluid transmission device, and a radially outermost position of the positioning member being located on a radially inner side relative to a radially outermost position of the cover,
   wherein the positioning hole includes a circular portion and a notched portion that is radially outward of the circular portion, and a radially outer side of the circular portion communicates with an outer periphery of the drive plate.

2. The fluid transmission device according to claim 1, wherein
   the positioning member is configured to protrude to an outside of the drive plate obliquely with respect to the axis direction of the fluid transmission device.

3. The fluid transmission device according to claim 1, wherein
   the positioning hole is provided on a portion of the drive plate that is opposed to the positioning member in the axis direction of the fluid transmission device.

4. The fluid transmission device according to claim 1, wherein
   the positioning member is a columnar member with a male thread, and
   the cover and the drive plate are fastened by tightening a nut to the positioning member arranged in the positioning hole.

5. The fluid transmission device according to claim 1, wherein
   the notched portion has a width in a circumferential direction larger than a width of the positioning member in the circumferential direction.

6. The fluid transmission device according to claim 5, wherein
   the positioning member is a columnar member with a male thread, and
   the cover and the drive plate are fastened by tightening a nut to the positioning member arranged in the positioning hole.

7. The fluid transmission device according to claim 6, wherein
   the notched portion has a width in the circumferential direction smaller than a diameter of the circular portion.

8. The fluid transmission device according to claim 1, wherein
   a radially outermost position of the positioning hole is located on a radially outer side relative to the radially outermost position of the positioning member.

9. The fluid transmission device according to claim 1, wherein
   the cover includes a polyhedron-shaped seat, the polyhedron-shaped seat is provided on the surface side of the cover at the radially outer position, the surface side of the cover is opposed to the drive plate, the polyhedron-shaped seat is configured to protrude toward the drive plate in the axis direction of the fluid transmission device, the polyhedron-shaped seal includes a fixing surface that is perpendicular to the positioning member, and the fixing surface fixes the positioning member to the polyhedron-shaped seat, and
   a first portion of the drive plate is bent so as to extend along the fixing surface, the positioning hole is provided in the first portion.

10. The fluid transmission device according to claim 1, wherein
    a second portion of the drive plate is bent so as to extend along an outer periphery of the cover, the second portion is located on the radially outer side relative to the radially outermost position of the cover.

* * * * *